US005603063A

United States Patent [19]
Au

[11] Patent Number: 5,603,063
[45] Date of Patent: Feb. 11, 1997

[54] DISK DRIVE COMMAND QUEUING METHOD USING TWO MEMORY DEVICES FOR STORING TWO TYPES OF COMMANDS SEPARATELY FIRST BEFORE QUEUING COMMANDS IN THE SECOND MEMORY DEVICE

[75] Inventor: Wing Y. Au, San Jose, Calif.

[73] Assignee: Quantum Corporation, Milpitas, Calif.

[21] Appl. No.: 267,143

[22] Filed: Jun. 27, 1994

[51] Int. Cl.$^6$ .................................................. G06F 13/00
[52] U.S. Cl. ............................................. 395/872
[58] Field of Search .................................. 395/650, 250, 395/872, 200.14, 401; 364/200; 371/37.1; 360/77.02

[56] References Cited

U.S. PATENT DOCUMENTS

| 4,208,714 | 6/1980 | Eklund et al. | 364/200 |
|---|---|---|---|
| 4,232,365 | 11/1980 | Englund | 364/200 |
| 4,458,316 | 7/1984 | Fry et al. | 364/200 |
| 4,583,166 | 4/1986 | Hartung et al. | 364/200 |
| 4,630,196 | 12/1986 | Bednar, Jr. et al. | 395/200.14 |
| 4,901,232 | 2/1990 | Harrington et al. | 364/200 |
| 5,058,110 | 10/1991 | Beach et al. | 370/85.6 |
| 5,121,480 | 6/1992 | Bonke et al. | 395/250 |
| 5,140,683 | 8/1992 | Gallo et al. | 395/425 |
| 5,175,732 | 12/1992 | Hendel et al. | 370/94.1 |
| 5,220,653 | 6/1993 | Miro | 395/275 |
| 5,241,546 | 8/1993 | Peterson et al. | 371/37.1 |
| 5,255,136 | 10/1993 | Machado et al. | 360/77.02 |
| 5,381,528 | 1/1995 | Brunelle | 395/250 |
| 5,414,845 | 5/1995 | Behm et al. | 395/650 |
| 5,444,853 | 8/1995 | Lentz | 395/250 |
| 5,446,855 | 8/1995 | Dang et al. | 395/401 |

OTHER PUBLICATIONS

Gibson, *Redundant Disk Arrays—Reliable, Parallel Secondary Storage,* MIT Press, Cambridge MA, ©1992, pp. 17–20: "Lowering I/O Response Time".

Geist & Daniel, "A Continuum of Disk Scheduling Algorithms", *ACM Trans. Computer Systems,* vol. 5, No. 1, Feb. 1987, pp. 77–92.

Teory & Pinkerton, "A Comparative Analysis of Disk Scheduling Policies", *Comm. of the ACM,* vol. 15, No. 3, Mar. 1972, pp. 177–184.

Denning, "Effects of Scheduling on File Memory", *AFIPS Joint Compuer Conference Proc.,* vol. 30, 1967, pp. 9–21.

Abbott, Robert K., and Garcia–Molina, Hector, "Scheduling I/O Requests with Deadlines: a Performance Evaluation", Proc. 11th Real–Time Systems Symposium, Lake Buena Vista, Florida, Dec. 5–7, 1990, IEEE Computer Society Press, pp. 113–124 Dec. 1990.

Primary Examiner—Thomas C. Lee
Assistant Examiner—Duo Chen
Attorney, Agent, or Firm—David B. Harrison

[57] ABSTRACT

Automatic disk drive command reception by an interface ASIC circuit from a host without firmware intervention lowers host-disk bus overhead. Separate command manipulation is used to build a command queue subject to performance enhancing features. The interface ASIC manages a FIFO and LIFO data structure in DRAM memory and immediately places incoming non-head-of-queue commands in the FIFO and head-of-queue commands in the LIFO. Collecting commands from DRAM memory and placing such commands into an SRAM command queue subject to performance enhancing features occurs independently of command reception. As a result, host-disk bus utilization is increased and the command storage capacity of the disk drive is not limited by the size of the SRAM command queue. Performance enhancing features still apply to a substantial number of queued commands, yet the number of commands which may be readily accepted from a host computer and held by the disk drive remains high.

16 Claims, 4 Drawing Sheets

DISK DRIVE COMMAND QUEUING METHOD USING TWO MEMORY DEVICES FOR STORING TWO TYPES OF COMMANDS SEPARATELY FIRST BEFORE QUEUING COMMANDS IN THE SECOND MEMORY DEVICE

FIELD OF THE INVENTION

The present invention relates to the queuing and management of commands received by a disk drive. More specifically, the present invention relates to handling a relatively large number of disk input/output (I/O) commands without compromising performance features applied to a command queue. The invention also achieves low bus overhead during I/O command reception to improve bus utilization.

BACKGROUND OF THE INVENTION

A disk drive receives multiple commands to execute essentially random disk address I/O transfers. In other words, the I/O commands require data to be written or read at various locations throughout the disk drive. When the commands arrive faster than they can be executed, they accumulate in a queue. By recognizing that I/O commands need not be executed in the order received, I/O throughput may be increased by changing the order of execution of queued commands. U.S. Pat. Nos. 4,583,166, 5,140,683, and 4,232,365 describe various queue reordering techniques. My co-pending application Ser. No. 08/149,982 now abandoned entitled ROTATIONAL LATENCY QUEUE REORDERING, filed on Nov. 10, 1993 and assigned in common to the assignee of the present application describes a queue reordering technique taking into account both seek time and rotational latency in determining the time delay between executing commands.

In management of queued I/O processes, performance enhancing features applied to queued command records have become an important aspect of disk drive operation. Background command preprocessing, rotational latency reordering, command dependency analysis, and data streaming have improved disk drive performance relative to a set of I/O processes queued in the disk drive. Performance enhancing features generally require per command information be maintained in the generally limited-in-size SRAM (static random access memory) resource. Each executable command record occupies a substantial amount of direct access SRAM memory. SRAM memory is preferred for holding the executable command records for its low access time and direct addressability by the disk drive microprocessor. Unfortunately, SRAM memory is a limited resource. Creating individual SRAM command records for a large number of I/O commands quickly consumes this valuable resource. For example, a typical disk drive architecture might allow a command queue depth of approximately 16 executable command records including performance enhancing information.

Operating system and device driver developments relative to disk usage have advanced significantly. Host computers now queue more and more I/O processes in the disk drive. Because host computers generate significant I/O commands for presentation to the disk drive, limitation in disk drive command queue depth is undesirable. The subject matter of the present invention, however, enables a host computer to submit a great number of I/O commands to the disk drive regardless of any limitation in SRAM resources.

Command queue processing by a disk drive can at times consume a significant amount of bus overhead time. For example, consider a disk drive receiving I/O commands from a host computer. During a command reception, an I/O command is accepted from the host computer by way of a bus, e.g., a Small Computer System Interface (SCSI) bus. Command records are created and inserted into the disk drive SRAM command queue during the command reception. This process of queue insertion during the command reception requires firmware intervention, i.e., execution of instructions by a disk drive microprocessor. If such process is performed while the disk drive is logically active on the SCSI bus, significant bus idle time passes as the microprocessor performs the tasks of I/O command reception and insertion into the command queue stored in the SRAM memory resource before the microprocessor can release the bus for use by other devices and resources.

Thus, disk drive I/O reception and processing within a command queue presents challenges with respect to disk drive operation in two significant areas. First, I/O command queues, to take advantage of performance enhancing features, quickly exhaust the limited and valuable SRAM resource. The SRAM resource immediately limits the number of commands available for computation, e.g. physical address data and dependency information by the disk drive in support of performance enhancing features, held in a command queue data structure. Second, I/O command reception requiring firmware intervention undesirably consumes, at times, significant bus overhead time, leading to lower bus utilization.

The subject matter of the present invention addresses these areas of disk drive I/O command management by establishing a command queuing system with performance enhancing features but also with virtually unlimited command queue depth and without firmware intervention during command reception thereby boosting bus utilization.

SUMMARY OF THE INVENTION

A method of disk drive command queue management in accordance with the present invention includes the steps of receiving by a first process commands from a host computer through an interface device of the disk drive having access to a first memory device and placing each received command therein. A second independent process queues the received commands by copying from the first memory device to a second memory device wherein the commands are maintained in a data structure appropriate for performance enhancing features. In accordance with one aspect of the method of the present invention, the first process distinguishes between first and second command types and stores each command type separately in the first memory device, whereby simple linear data structures may be employed in the first memory device to manage the first and second command types.

An apparatus in accordance with the present invention includes a first memory operating at a first access speed and having a first size and a second memory operating at a second access speed greater than the first access speed and having a second size less than the first size. The first memory may be a DRAM memory and the second memory may be a SRAM memory. An interface block of the disk drive automatically receives commands from a host device by way of a disk drive interface and maintains in the first memory appropriate linear data structures holding commands as received from the host device. A processor element then later, and independently, moves commands from the first memory device to the second memory device. The processor element also performs calculation of any information in support of performance enhancing features. Accordingly, command records queued within the second memory device may be subject to performance enhancing features, possibly including reordering of the sequence of command execution.

In accordance with one aspect of the disk drive of the present invention, the first memory device includes linear data structures holding head-of-queue commands separately from non-head-of-queue commands whereby the processor element may directly recover head-of-queue commands from the simple linear data structures of the first memory device without introducing incongruity into the sequence of commands held in the first memory device.

Overall, the present invention provides separate processes for command reception and command manipulation in building a command queue subject to performance enhancing features. The present invention provides a command queuing system of virtually unlimited capacity from the perspective of the host computer submitting commands thereto.

It is an object, therefore, of the present invention to increase command queue capacity without diminishing the availability of performance enhancing features normally applied to a relatively small number of commands maintained in a relatively fast, directly accessible memory device of the disk drive. This supports a virtual queue structure meeting high-performance requirements and also providing a massive command queuing subsystem.

Because the data structures in the first memory element are maintained in a linear fashion, the interface block can be designed with low circuit complexity to receive commands automatically at high speed and without intervention of the processor element. This new design results in quick processing of command reception to greatly reduce bus overhead time, thereby to improve bus utilization.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

The preferred embodiment of the present invention finds application in a method and apparatus for management of a collection of I/O commands received by a disk drive device from one or several host computers. It will be understood that the subject disk drive will posses certain performance enhancing features applied to a queue of I/O commands. While not detailed herein, it will be understood that such performance enhancing features are applied to a set of executable I/O commands to improve overall performance, i.e., reduce average access time for the disk drive, and generally involve information calculation, rapid analysis, and reordering of the execution sequence for a set of executable commands.

Figure 1:
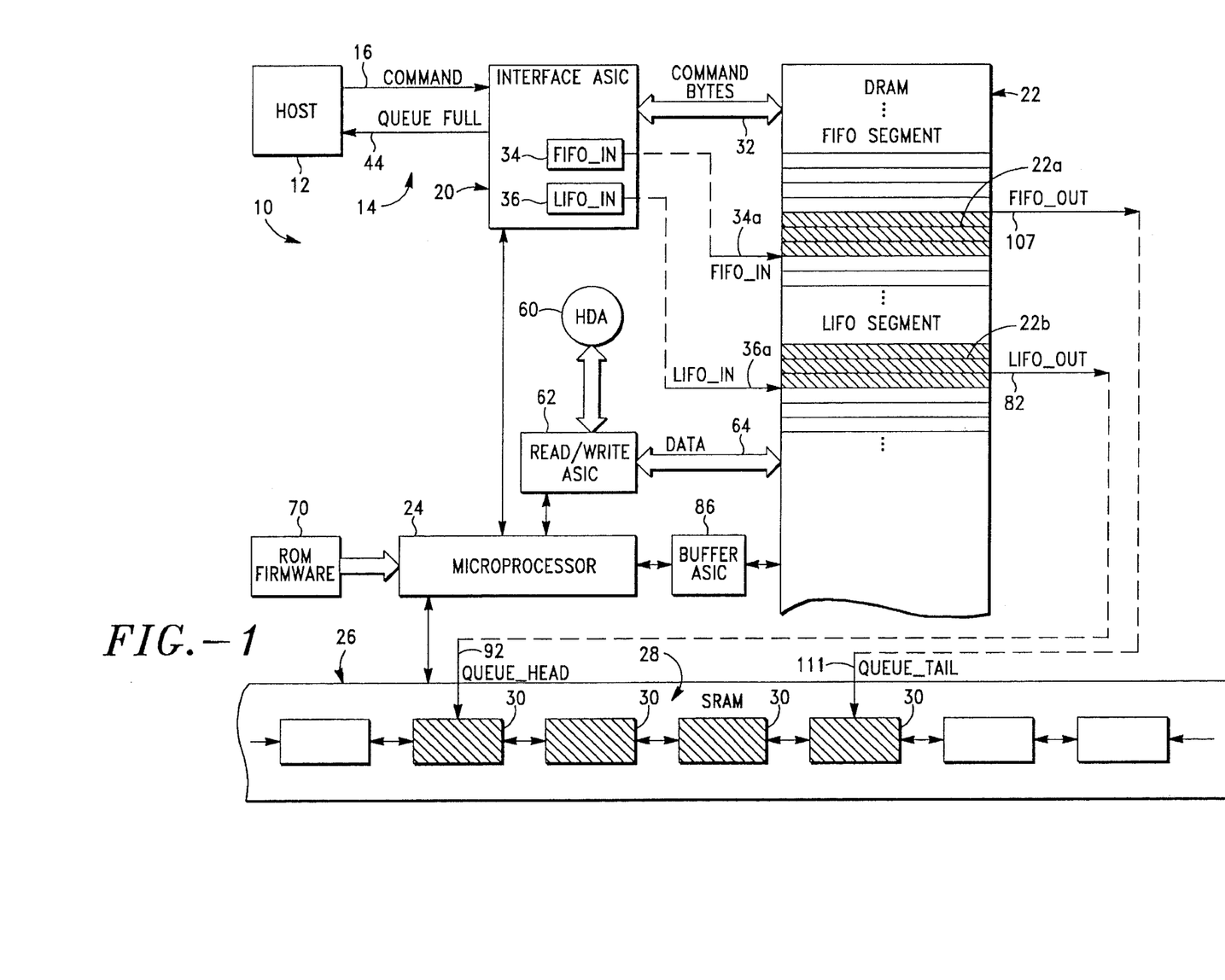
FIG. 1 illustrates generally by block diagram a disk drive architecture in implementation of a preferred embodiment of the present invention.

FIG. 1 illustrates generally by simplified block diagram relative portions of a disk drive 10 according to a preferred embodiment of the present invention. In FIG. 1, a host computer 12 interacts with disk drive 10 by way of a SCSI bus interface 14. While SCSI bus interface 14 includes a variety of data and command paths (not illustrated), FIG. 1 shows delivery of an I/O command 16 from host computer 12 to disk drive 10. Furthermore, host computer 12 as illustrated in FIG. 1 may be taken to represent one or several host computers, each able to interact with disk drive 10 by way of SCSI bus 14 in accordance with SCSI protocol. Command 16 includes, therefore, many components in implementation of the SCSI bus protocol. Such components include a command description block designating the I/O process to be executed, an identification of the host computer initiating the I/O process, and a command tag identifying the command 16 uniquely within a set of commands issued by a given host computer 12.

The host identification and command tag are collectively known as a "nexus" under SCSI protocol. The nexus allows repeated connection and reconnection of the host computer 12 to the disk drive 10 for a particular I/O process. By establishing the nexus during the selection and message phases prior to actual command byte reception, the host computer may be connected, disconnected, and reconnected throughout completion of the command 16 delivery to disk drive 10 and throughout completion of the command 16 by disk drive 10.

Disk drive 10 includes an interface ASIC (application specific integrated circuit) 20 interacting with host computer 12 by way of SCSI bus 14. Interface ASIC 20 is of limited processing and data storage capability, but can accept immediately a given command 16 by way of SCSI bus 14. Under prior disk drive architectures, an interface ASIC would then hold the command until a microprocessor under firmware control could intervene and collect the command for insertion into a command queue. If, however, the microprocessor had higher priority tasks to perform, the interface ASIC could not receive any new commands from the SCSI bus and would capture the SCSI bus 14 until microprocessor firmware intervention could occur.

Under the present invention, however, interface ASIC 20 immediately delivers command 16 to an intermediate storage area, i.e., a portion of DRAM (dynamic random access memory) memory 22, pending further processing, i.e., firmware processing by microprocessor 24. In this manner, bus 14 overhead is substantially reduced by divorcing the process of hardware command reception, i.e., performed independently by interface ASIC 20, from firmware queue insertion, performed later by microprocessor 24 and at the convenience of microprocessor 24.

Disk drive 10 includes an SRAM (static random access) memory 26 holding a command queue 28 implemented as a circular double linked list of queue records 30 subject to performance enhancing features. As may be appreciated, SRAM memory 26 is substantially faster and more expensive than the DRAM memory 22. Accordingly, SRAM memory 26 is a more precious component than DRAM memory 22. In accordance with the present invention, SRAM memory 26 need not be of substantial size for disk drive 10 to collect a virtually unlimited number of commands 16 by way of SCSI bus 14. Numerous commands are held in the intermediate storage area provided by DRAM memory 22, and are moved when appropriate and convenient by microprocessor 24 to the SRAM 26 for placement in the queue 28 and application to performance enhancing features.

The queue head pointer 92 and queue tail pointer 111 mark the beginning and end of the queue 28. The queue head pointer 92 also points to a command currently under execution. A QUEUE COUNT indicates the number of queue records 30 held in queue 28. In a typical implementation of disk drive 10, the queue 28 may hold approximately 16 queue records 30.

When selecting a command for execution, microprocessor 24 always selects a queue record 30 at the front of queue 28. The microprocessor 24 also selectively inserts new queue records 30 at either the front or rear of queue 28 depending on command priority. The microprocessor 24 must also support performance enhancing features relative to the queue 28. Such performance enhancing features may require reordering of the queue 28. It will be understood, therefore, that at certain times microprocessor 24 will analyze the content of queue 28 and based on the relationship among queue records 30 stored therein possibly impose a new order of execution with the objective of improving overall disk drive 10 performance.

Host computer 12 designates certain ones of commands 16 as being "head-of-queue" commands 16 and all other commands, as relevant to the present discussion, are taken as "non-head-of-queue" commands 16. Head-of-queue commands must be executed before any other commands held by disk drive 10. Interface ASIC 20 distinguishes between head-of-queue commands 16 and other commands 16 in writing commands 16 to the DRAM memory 22. In implementation of such distinction, interface ASIC 20 maintains in DRAM 22 a FIFO segment 22a and a LIFO segment 22b. All commands 16 are first written to DRAM memory 22 by way of data path 32. Non-head-of-queue commands 16 go to the FIFO segment 22a and head-of-queue commands 16 go to the LIFO segment 22b. Thus, normal commands are processed on a first-received, first-executed basis while head-of-queue commands are executed on a last-received, first-executed basis.

FIFO segment 22a and LIFO segment 22b, collectively referred to herein as command buffers, hold buffer command records with each buffer command record holding a command description block as well as the nexus relative to a given command 16, i.e., information as provided by the host computer 12 by way of SCSI bus 14. Because the buffer command records reside in DRAM 22, which is abundant in the disk drive 10, the depth of command queuing within disk drive 10 from the perspective of host computer 12 is virtually unlimited. Because the buffer command records maintained in DRAM memory 22 are of minimal size, i.e., just the data provided by host computer 12, disk drive 10 can collect a large number of buffer command records without practical limitation relative to the size of DRAM memory 22. For example, the FIFO segment 22a and LIFO segment 22b can each hold up to 255 commands 16. As may be appreciated, simple mechanisms may be used by interface ASIC 20 to prevent overflow and to provide a buffer wrap-around function within the segments 22a and 22b.

Each buffer command record in DRAM memory 22, i.e., in the FIFO segment 22a and LIFO segment 22b contains information that fully identifies a nexus relative to an I/O process requested by host computer 12, and thereby contains all pertinent information for executing this command and the associated disconnections and reconnections. The buffer records of segments 22a and 22b are formed and put into the segments 22a and 22b completely and independently by the interface ASIC 20. In this manner, queue 28 insertion by firmware, i.e., by microprocessor 24, is done later after the bus 14 transaction has ended and disk drive 10 is disconnected from the host computer 12. As may be appreciated, bus disconnection is automatically performed by the interface ASIC 20 to reduce bus overhead time.

Interface ASIC 20 includes a FIFO_IN register 34 and a LIFO_IN register 36. FIFO_IN register 34 holds a FIFO_IN pointer 34a used by interface ASIC 20 to place new non-head-of-queue commands 16 at the end of the FIFO data structure maintained in FIFO segment 22a. LIFO_IN register 36 holds a LIFO_IN pointer 36a for placing new head-of-queue commands 16 at the top of the stack data structure of LIFO segment 22b.

Interface ASIC 20, though of limited processing ability, adequately performs management functions relative to the FIFO data structure of segment 22a and the LIFO data structure of segment 22b. More particularly, such management generally requires only a need to increment the registers 34 and 36 and write new commands 16 into DRAM memory 22 at addresses corresponding to the content of registers 34 and 36. The FIFO_IN register also has to take care of buffer wrap-around, i.e. reloading the FIFO_IN pointer to the beginning location when it increments to the end. Such capability is not needed for the LIFO_IN register because of its last-in, first-out nature.

Figure 2:
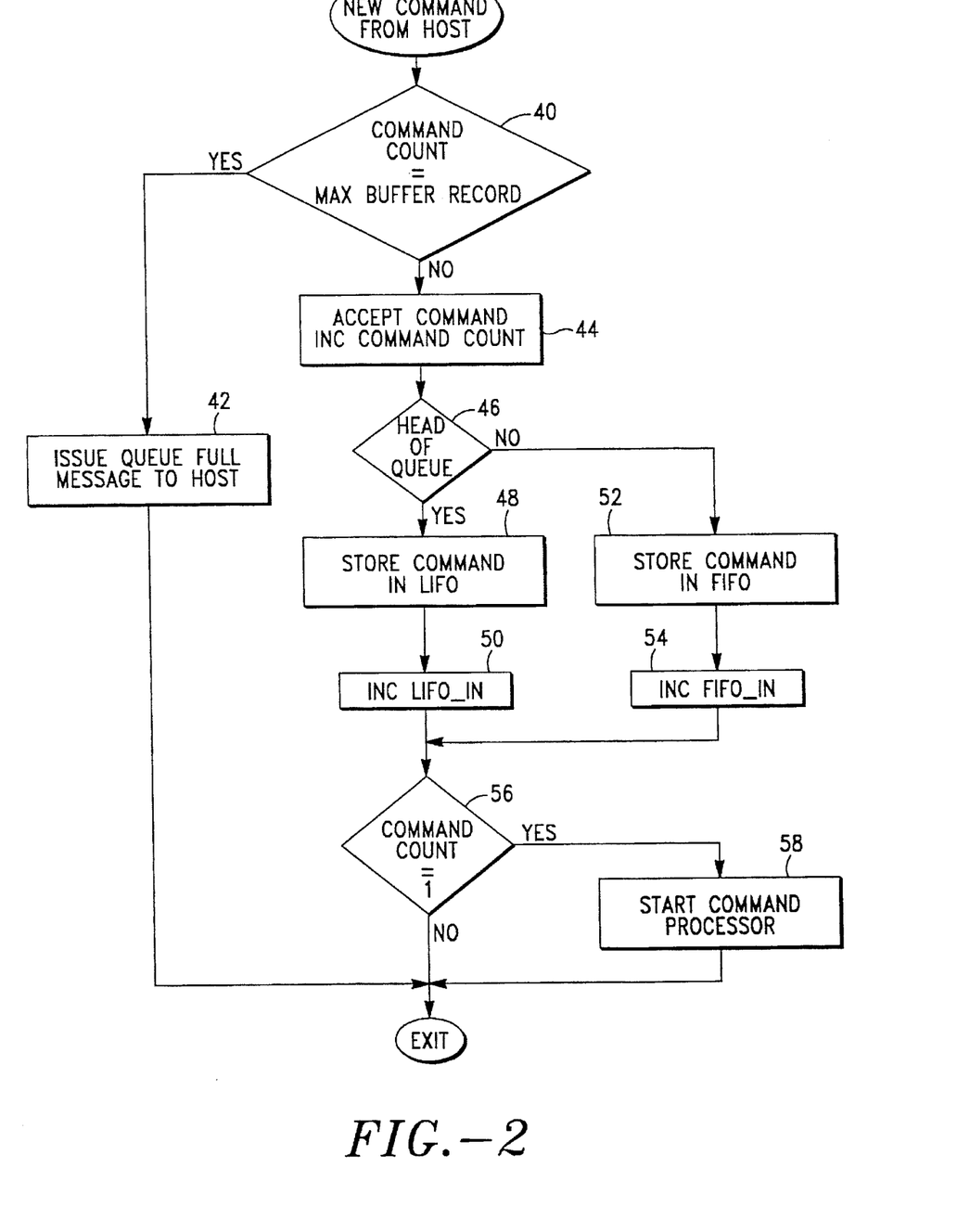
FIG. 2 illustrates by flow diagram processing automatically and autonomously executed by an interface ASIC of the disk drive of FIG. 1 when receiving a new command from a host device.

FIG. 2 illustrates generally processing executed by interface ASIC 20 when receiving a new command 16 from host computer 12. In FIG. 2, interface ASIC 20 first determines in decision block 40 whether a new command 16 can be accepted by disk drive 10. Interface ASIC maintains as indication an of the capacity for buffer command records in segments 22a and 22b a MAX BUFFER RECORD indicator. Interface ASIC 20 also maintains a COMMAND COUNT and, in decision block 40, compares COMMAND COUNT to the MAX BUFFER RECORD indicator. If COMMAND COUNT has reached MAX BUFFER RECORD, then processing branches through block 42 where interface ASIC 20 issues a QUEUE FULL message 44 (FIG. 1) to the host computer 12 indicating inability to accept the most recently presented command 16.

Processing otherwise advances from decision block 40 to block 44 where interface ASIC accepts the new command 16 and increments COMMAND COUNT to reflect acceptance by disk drive 10 of a new command 16. In decision block 46, interface ASIC 20 determines the type of command 16 received, i.e., whether the new command 16 is a head-of-queue command or a non-head-of-queue command.

If the new command 16 is a head-of-queue command, processing advances to block 48 where interface ASIC 20 stores the new command 16 in the LIFO segment 22b and, in block 50, increments the LIFO_IN register 36 to account for the new command 16 in the LIFO data structure of segment 22b. If the new command 16 is a non-head-of-queue command, however, processing branches through blocks 52 and 54 where interface ASIC 20 stores the new command 16 in the FIFO segment 22a and increments the FIFO_IN register 34, respectively.

In any case, processing eventually reaches decision block 56 where interface ASIC 20 compares the current COMMAND COUNT to a value one. If the current COMMAND COUNT is one, then processing branches through block 58 where interface ASIC 20 starts the command processor firmware executed by microprocessor 24 (FIG. 3) as described more fully hereafter. Processing then terminates from each of blocks 56 and 58.

Thus, interface ASIC 20 receives a new command 16 and immediately places the new command 16 as a buffer record in the intermediate command holding area provided by DRAM memory 22. More particularly, interface ASIC 20 distinguishes between head-of-queue commands and non-head-of-queue commands by storage in the LIFO and FIFO data structures, respectively. Interface ASIC 20 stands ready to then immediately receive a next command 16 provided by host 12. Important to note, the process of receiving a new command 16 demands no firmware intervention, i.e., immediate intervention by microprocessor 24. Accordingly, microprocessor 24 need not immediately respond to host 12 presentation of a new command 16. Microprocessor 24 need not monopolize SCSI bus 14 when involved with higher priority tasks. The interface ASIC 20 process of new command 16 reception is divorced entirely from the microprocessor 24 process of inserting new commands 16 into queue 28.

From the perspective of host computer 12, disk drive 10 accepts virtually an unlimited number of commands 16 and rarely presents a QUEUE FULL message 44. DRAM memory 22 is abundant in disk drive 10 and holds a significant number of new commands 16, e.g., 255 total buffer command records. Despite this ability by disk drive 10 to accept immediately and maintain a large number of commands 16, performance enhancing features are still applied by disk drive 10 to the executable command records 30 held in queue 28. Thus, under the present invention, prior limitation in the number of commands maintained at a given time by a disk drive is eliminated, but without sacrificing use of performance enhancing features.

Returning to FIG. 1, the process of moving commands 16 from DRAM memory 22 and into SRAM memory 26 by microprocessor 24 occurs independently of any bus 14 activity and interface ASIC 20 activity relating to command 16 reception. In addition to moving the buffer command records of the FIFO data structure in segment 22a and the LIFO segment data structure in segment 22b, microprocessor 24 also calculates physical addresses relative to a rotating medium 60 whereby microprocessor 24 may deliver I/O commands represented by the queue records 30 to a read/write ASIC 62. Read/write ASIC 62 accesses medium 60 and delivers data taken from medium 62 for delivery to DRAM 22, or takes data from DRAM 22 for delivery to medium 60, by way of data path 64. The following discussion will focus, however, on the management by microprocessor 24 of the set of commands 16 stored in DRAM memory 22 and appropriately moving such commands from DRAM memory 22 into the SRAM memory 26 as the queue records 30.

As noted herein above, the SCSI protocol distinguishing head-of-queue commands 16 requires that such high priority commands be executed immediately. Thus, in moving commands from DRAM memory 22 to SRAM memory 26, i.e., into the queue 28, microprocessor 24 first looks for head-of-queue commands in the LIFO data structure of segment 22b. If the LIFO data structure is empty, then microprocessor 24 will look to queue 28 for a command to execute. Due to queue background processes executed, e.g., reordering under performance enhancing features or the process illustrated in FIG. 4, microprocessor 24 must in the algorithm of FIG. 3 explicitly look to queue 28 in seeking a next command to execute. If queue 28 is empty, then the lower priority commands found in the FIFO data structure of segment 22a are moved into queue 28 for execution.

Figure 3:
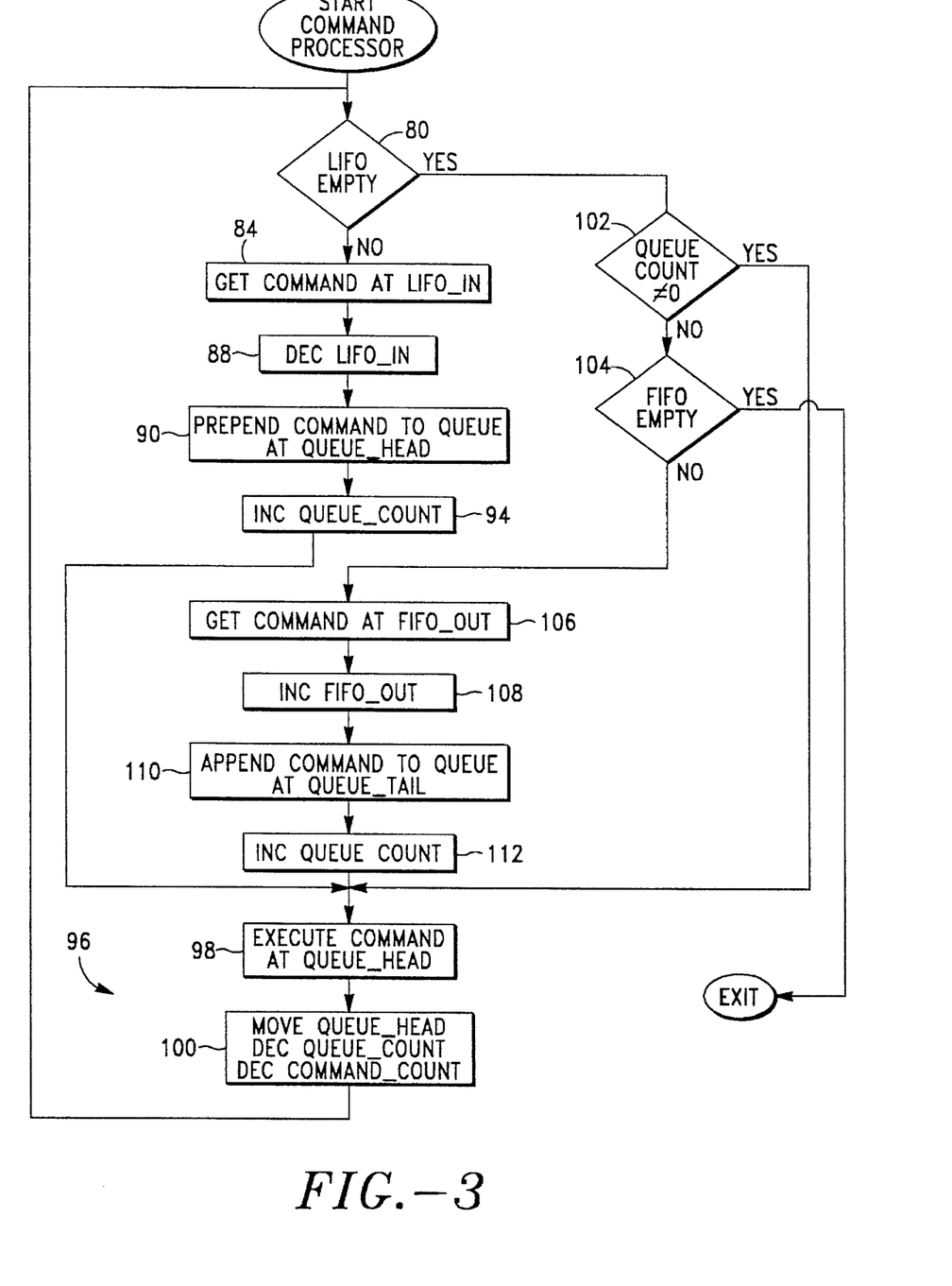
FIG. 3 illustrates by flow diagram firmware command execution processing performed by a microprocessor of the disk drive of FIG. 1 independently of the interface ASIC command reception process of FIG. 2.

FIG. 3 illustrates generally a command processor algorithm executed by microprocessor 24 according to programming stored in a ROM firmware memory 70. The algorithm represented in FIG. 3 corresponds to the command processor initiated by interface ASIC 20 in block 58 of FIG. 2. The command processor algorithm of FIG. 3 continues execution as a repeating control loop until no commands remain in the LIFO data structure of segment 22b, the command queue 28 of SRAM 26, or in the FIFO data structure of segment 22a.

In FIG. 3, the command processor begins in decision block 80 where microprocessor 24 interrogates the LIFO data structure of segment 22b. Any commands 16 stored in the LIFO segment 22b represent the highest priority commands and are to be executed immediately. Microprocessor 24 maintains a LIFO_OUT pointer 82 (FIG. 1) to collect buffer records from the LIFO data structure of segment 22b. If the LIFO data structure is not empty, then processing advances to block 84 where microprocessor 24 collects a command buffer record from DRAM memory 22 by way of a buffer ASIC 86. Buffer ASIC 86 provides an indirect channel of access for microprocessor 24 relative to DRAM memory 22. Continuing to block 88, microprocessor 24 then decrements the LIFO_IN register 36 of interface ASIC 20 to reflect collection of a buffer record from the LIFO data structure of segment 22b.

In block 90, microprocessor 24 advances or 'prepends' the new command 16 to the head-of-queue 28 as indicated by a queue head pointer 92 (FIG. 1). The process of queue record prepending includes appropriate management of the queue head pointer 92 to reflect a new queue record 30 in queue 28. In block 94, microprocessor 24 increments a QUEUE COUNT variable to reflect the total number of queue records 30 maintained in queue 28.

At this point, microprocessor 24 has identified a high priority command 16 to be executed immediately, i.e., the queue record 30 just placed in queue 28. Accordingly, processing then advances from block 94 to an execution sequence 96 comprising blocks 98 and 100 of FIG. 3. In block 98, microprocessor 24 initiates execution of the command represented by the queue record 30 at the queue head pointer 92. More particularly, microprocessor 24 delivers to the read/write ASIC 62 appropriate control information to begin execution of the corresponding I/O command. Continuing to block 100, after completing command execution microprocessor 24 moves the queue head pointer 92, i.e., deletes the just-executed queue record 30 from queue 28. The variables QUEUE COUNT and COMMAND COUNT are then decremented in block 100 to reflect removal of the just-executed command from the disk drive 10 command system. Processing then returns to block 80 to pick up a next command for execution. If additional commands remain in the LIFO data structure of segment 22b, then processing repeats as described above.

When microprocessor 24 determines in block 80 that the LIFO data structure of segment 22b is empty, then processing advances to decision block 102 where microprocessor 24 interrogates the QUEUE COUNT variable to determine whether queue 28 holds any further queue records 30 for execution. If queue 28 contains additional records 30 for execution, then processing advances from decision block 102 to the execution sequence 96 where a next member of queue 28 is executed as described herein above.

If microprocessor 24 determines in blocks 80 and 102 that neither the LIFO data structure nor the queue 28 contain I/O commands for execution, then processing advances to decision block 104 where microprocessor 24 interrogates the FIFO data structure of segment 22a. If the FIFO data structure is empty, then processing exits from the decision block 104. As may be appreciated, upon subsequent receipt by disk drive 10 of a command 16, the algorithm of FIG. 2 executed by interface ASIC 20 reinitiates the command processor algorithm of FIG. 3.

If, however, decision block 104 determines that additional commands may be found in the FIFO data structure of segment 22a, then processing advances to block 106 where microprocessor 24 collects from the FIFO data structure a buffer command record by use of a FIFO_OUT pointer 107 (FIG. 1). The FIFO_OUT pointer 107 is then incremented in block 108 to reflect removal from segment 22a of a buffer record. Continuing to block 110, microprocessor 24 appends the command taken from the FIFO data structure to the queue 28. As may be appreciated, appending a command record 30 to queue 28 includes reference to and modification of a QUEUE TAIL pointer 111. In block 112, QUEUE_COUNT is incremented and processing advances to execution sequence 96 where the command at the front of queue 28 is executed. Processing then returns to block 80.

Figure 4:
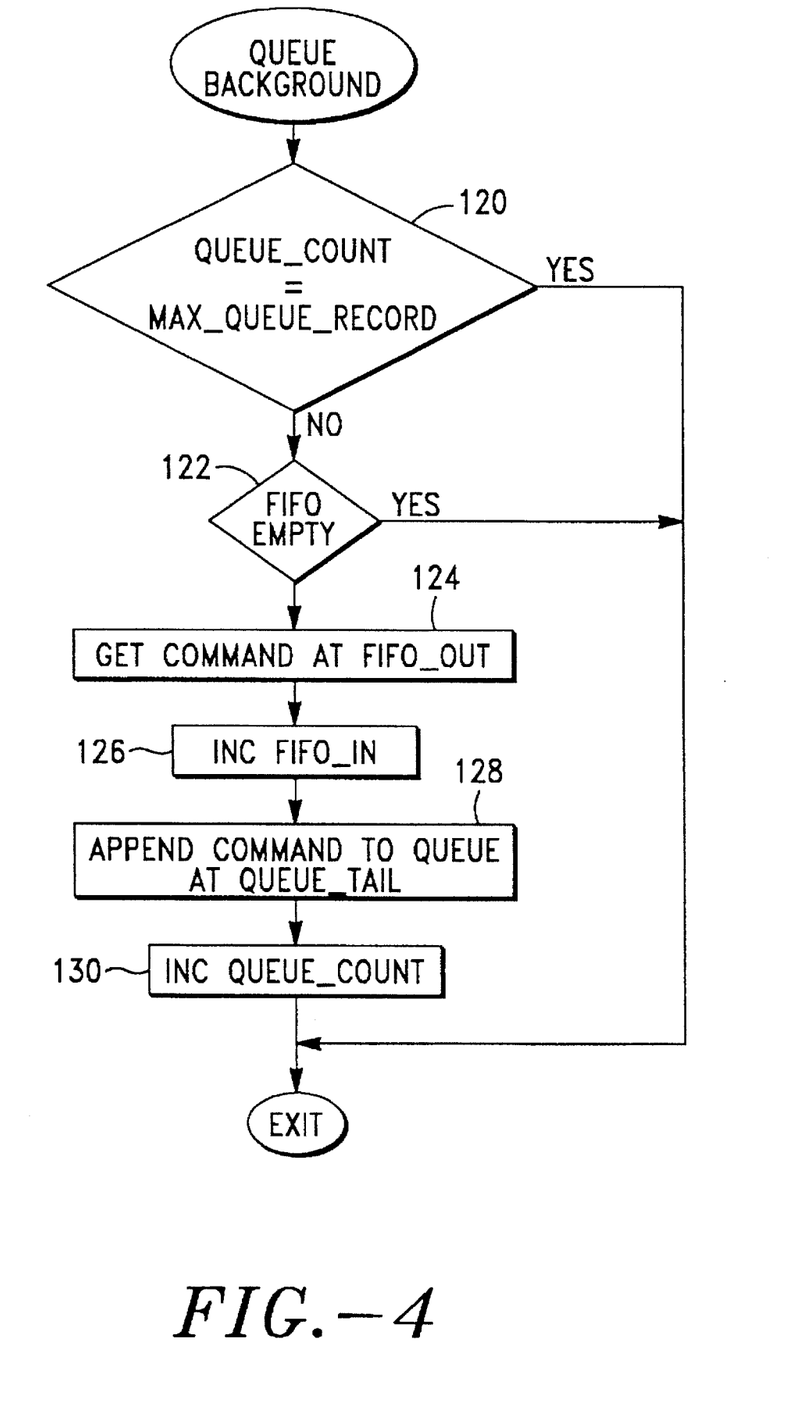
FIG. 4 illustrates by flow diagram firmware background processing also executed independently by the microprocessor of FIG. 1 as a command queue management function.

FIG. 4 illustrates a background procedure executed by microprocessor 24 during, for example, disk drive seek time or data transfers, i.e., during otherwise idle processing time when executing an active command. Generally, the algorithm of FIG. 4 examines the FIFO data structure of segment 22a and attempts to bring commands therefrom into queue 28. Important to note, performance enhancing features such as command preprocessing and queue reordering are performed relative to queue 28, not relative to the buffer command records maintained in DRAM memory 22. Generally, performance enhancing features are not applied to the head-of-queue commands 16 because these commands are by definition taken directly to the next executed location in queue 28. Accordingly, the algorithm of FIG. 4 does not attempt to bring commands from the LIFO data structure in segment 22b, its purpose is to expose non-head-of-queue commands to performance enhancing features.

In FIG. 4, the queue background process begins in decision block 120 where microprocessor 24 compares QUEUE COUNT to a MAX QUEUE RECORD reference. If queue 28 is full, then processing simply terminates from the queue background procedure of FIG. 4. Processing otherwise advances to decision block 122 where microprocessor 24 examines the FIFO data structure of segment 22a. If the FIFO data structure is empty, then processing terminates.

Otherwise, processing advances to block 124 where a non-head-of-queue command is taken from the FIFO data structure at the location indicated by the FIFO_OUT pointer 107. In block 126, the FIFO_OUT pointer 107 is incremented to remove from the FIFO data structure the collected command. Continuing to block 128, the newly collected command is appended to the queue 28 as indicated by the QUEUE TAIL pointer 111. As may be appreciated, the process of appending a command to the tail of queue 28 includes manipulation of the QUEUE TAIL pointer 111.

Thus, the queue background algorithm moves the relatively lower priority commands maintained in the FIFO data structure into the queue 28 for execution. As may be appreciated, because performance enhancing features are applied to the records 30 maintained in queue 28, it is important to have as many such records as possible within queue 28 so that maximum performance may be achieved against the largest possible set non-head-of-queue commands.

In overall operation by keeping an executable command queue in the fast and directly addressable SRAM, disk drive 10 may still apply proven performance enhancing features such as background command preprocessing, rotational latency reordering, command dependency analysis and data streaming. All these features require that substantial additional information be maintained on a per command record basis. Because command queue reordering can be efficiently done in a double linked list structure, requiring that new commands be immediately placed in a command queue following reception places hardship on the disk drive 10, and may monopolize the bus 14 whenever the microprocessor 24 cannot immediately process an incoming command 16. By consistently moving commands from the FIFO data structure of segment 22a to the executable command queue, disk drive 10 may apply such performance enhancing features to a subset of commands queued within the drive. The size of the subset is adjustable to within reasonable limits as imposed by the size of SRAM memory space and available microprocessor 24 processing time.

Thus, the queue background process of FIG. 4 keeps the queue 28 as full as possible so that performance enhancing features may be applied to as large a subset of queued commands as possible to maximize performance, while still allowing head-of-queue commands to be placed immediately into a next executed position.

Separate LIFO and FIFO data structures within DRAM memory 28 support simple command reception i.e., simply incrementing pointer registers within the interface ASIC 20. This leaves the more complex task of command queue insertion to the more capable microprocessor 24, but at the convenience of microprocessor 24 and without interfering with SCSI bus 14 activity. Thus, the dual command buffers, i.e., use of the LIFO and FIFO data structures, in conjunction with the LIFO_IN and FIFO_IN data pointers of interface ASIC 20 allows interface ASIC 20, together with the command processor firmware, to get head-of-queue commands immediately handled semantically correctly according to SCSI specifications without excessive firmware overhead.

Employing a single command buffer within DRAM memory 22 would require further complexity in the process of command reception. More particularly, the simplified process of merely incrementing the FIFO_IN register 34 and LIFO_IN register 36 may be insufficient when using a single command buffer. With head-of-queue commands interspersed with non-head-of-queue commands in the DRAM memory 22, priority removal of head-of-queue commands, e.g., by microprocessor 24, would leave "holes" in a single command buffer and cause fragmentation therein. Because the interface ASIC 20 preferably should not deal with such complex data structure manipulation, i.e., deal with "holes" and fragmentation in the command buffer, the dual segment approach as illustrated herein provides separate storage of the head-of-queue commands and requires only simple pointer increment functions by interface ASIC 20 to place new commands 16 within DRAM memory 22.

Thus, an improved method and apparatus for disk drive operation has been shown and described. The primary objective in such method and apparatus is to maintain the advantages of performance enhancing features while not limiting command queue depth. The command queuing system of the present invention makes separate the process of command reception and the process of command insertion into a command queue subject to performance enhancing features. The process of command reception is executed by hardware devices, e.g., interface ASIC 20, with direct access to the abundant DRAM memory 22 whereby commands when received may be immediately placed in an intermediate holding area. Important to note, the intermediate holding area allows distinction between the high priority head-of-queue commands and other commands. Furthermore, the management of data structures in DRAM memory 22 is a simplified process, i.e., mere linear increment and wrap-around functions applied to pointers for records within the FIFO and LIFO data structures. Accordingly, interface ASIC 20 need not be a complex device i.e., need not be capable of managing a double link list subject to reordering.

Furthermore, the process of command reception need not include firmware intervention, i.e., does not require microprocessor 24 involvement. Accordingly, commands 16 are immediately accepted from SCSI bus 14 regardless of current activity by microprocessor 24, i.e., regardless of whether microprocessor 24 is available or not available due to higher priority tasks under execution. The task of command insertion into the queue 28 necessarily requires firmware intervention. The relatively more complex double link list data structure of queue 28 requires more complex manipulation, but is easily implemented in the firmware programming of microprocessor 24 and directly addressable SRAM memory 26.

Finally, the process of enhanced command execution requires calculation of various data including physical address data and, more importantly, a collection of data necessary for completing the queue records 30 in implementation of various performance enhancing features. This information is kept in the fast and directly addressable SRAM queue. Thus, performance enhancing features remain available for manipulating execution order of a substantial number of commands pending within disk drive 10.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. In a disk drive receiving commands from a host device via an interface, the disk drive having a head-disk assembly including a rotating disk data storage medium for non-volatile storage and retrieval of user data in accordance with commands received from the host device, a method of disk drive command queue management carried out entirely within the disk drive and comprising the steps:

receiving commands from the host device, by an interface disk drive process carried out by an interface device within the disk drive having access to the host device and to a first volatile memory device within the disk drive and wherein the interface disk drive process distinguishes between commands of first and second command types and stores separately commands of said first and second command types in said first volatile memory device;

withdrawing each received command from the first volatile memory device and queuing, by a queuing process independent of said interface process, received commands, said queuing process being carried out by a programmable digital processor device within the disk drive having access to a second volatile memory device within the disk drive, and said queuing process including the step of storing commands in queued order in said second volatile memory device;

reading and executing commands from said second volatile memory device by the programmable digital processor device within the disk drive in order to provide said non-volatile storage and retrieval of user data to and from the rotating disk data storage medium; and wherein said first volatile memory device is of first access speed and fist size and said second volatile memory device is of second access speed and second size, said first size being greater than said first access speed.

2. A method according to claim 1 wherein said first command type is a head-of-queue command type designated as such by said host device.

3. A method according to claim 1 wherein a command of said first command type is placed in said queuing step in a data structure of said second volatile memory device at a next executed position.

4. A method according to claim 1 wherein a command of said second command type is placed in said queuing step at an end-of-queue position within said second volatile memory device.

5. A method according to claim 1 wherein said queuing step comprises the steps of:

taking from said first volatile memory device high priority commands; and placing said high priority commands at a next-executed position in said second volatile memory device.

6. A method according to claim 1 further comprising the step of background queue processing where selected messages are taken from said first volatile memory device into said second volatile memory device.

7. A method according to claim 6 wherein said selected messages are non-head-of-queue messages.

8. A method according to claim 1 wherein said queuing step includes calculating physical addresses relative to the rotating disk data storage medium within the disk drive and calculating information in implementation of disk drive performance enhancing features including at least one of background command preprocessing, rotational latency reordering of commands, command dependency analysis, and data streaming.

9. A disk drive responsive to a host, the host providing a given disk drive interface, the disk drive having a head-disk assembly including a rotating data storage disk for non-volatile storage and retrieval of user data in accordance with commands received from a host and comprising:

a first volatile memory operating at first access speed and having a first size;

a second volatile memory operating at second access speed greater than said first access speed and having second size less than said first size;

an interface circuit block receiving commands from said host device by way of said disk drive interface and storing and maintaining said commands in data structures in said fist volatile memory, wherein said commands are of first type and second type and said interface circuit block maintains separate data structures for said first command type and said second command type in said first volatile memory; and a disk drive processor for reading said commands from the data structures of said first memory, for queuing said commands by determining command execution priority, and for writing said commands into said second memory in a queue order, said commands in said second memory being executed by said disk drive processor in queue order.

10. A disk drive according to claim 9 wherein said first command type is a high priority command type maintained in a last-in, first-out data structure of said first volatile memory.

11. A disk drive according to claim 9 wherein said second command type is other than said high priority command type and maintained in a first-in, first-out data structure of said first volatile memory device.

12. A disk drive according to claim 9 wherein said first command type is a high priority command type and said second command type is other than said first type.

13. A disk drive according to claim 12 wherein said first command type is maintained in a last-in, first-out data structure of said first volatile memory device and said second command type is maintained in a first-in, first-out data structure of said first volatile memory device.

14. A disk drive according to claim 13 wherein said last-in, first-out data structure and said first-in, first-out data structure each comprise a sequence of sequentially addressed locations in said first volatile memory device.

15. A disk drive according to claim 14 wherein said data structures of said first volatile memory device are accessed by way of corresponding pointer registers maintained by said interface circuit block.

16. A disk drive according to claim 9 wherein said first volatile memory device is a dynamic random access memory (DRAM) device and said second volatile memory device is a static random access memory (SRAM) device.

\* \* \* \* \*